Jan. 18, 1927.

L. A. OSGOOD

SCALE

Filed April 6, 1920

1,614,681

Inventor
Louis Ashley Osgood
By his Attorneys
Kerr Page Cooper & Hayward

Patented Jan. 18, 1927.

1,614,681

UNITED STATES PATENT OFFICE.

LOUIS ASHLEY OSGOOD, OF DAYTON, OHIO, ASSIGNOR, BY MESNE ASSIGNMENTS, TO INTERNATIONAL SCALE COMPANY, A CORPORATION OF ILLINOIS.

SCALE.

Application filed April 6, 1920. Serial No. 371,684.

This invention relates to scales for weighing commodities, particularly automatic scales of the class (for example the type described in my prior Patents Nos. 1,198,650, 1,198,651 and 1,198,757) in which the weighing capacity of the scale can be increased at will by depositing "capacity" weights upon one of the scale levers, the capacity weights being mounted preferably on a pivoted carrier which, as it is rocked in one direction by the operator, deposits the weights one at a time on the scale lever and as it is rocked in the opposite direction picks the weights up off the lever. The invention pertains more especially to the mechanism provided to indicate the increase in the weighing capacity of the scale as the capacity weights are added to the weigh-beam or other lever, and to the connection between the weigh-beam or other scale lever and the movable support, as for example a platform, on which the article to be weighed is placed. The chief object of the invention is to provide improved devices which will be simple in construction, convenient in adjustment and withal accurate in operation. To these and other ends the invention comprises the novel features of construction and combinations of elements hereinafter described.

Referring to the accompanying drawing, in which the preferred embodiment of the invention is illustrated, Fig. 1 is a rear view of the complete scale except the platform or other support for the articles to be weighed.

Figure 4:
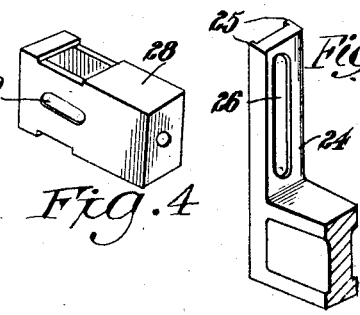
Fig. 4 is a perspective view of the horizontally adjustable portion of the two-part nose iron on one of the scale levers through which the pull of the article being weighed is transmitted to the weigh-beam.
Figure 5:
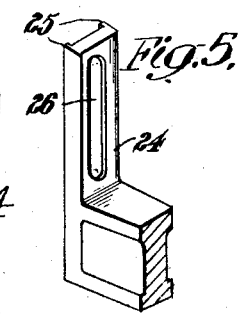
Fig. 5 is a perspective view illustrating the vertically adjustable portion of the nose iron.

The weigh-beam 10, fulcrumed at 11, carries on the left side of the fulcrum a rack rod 12 having at its top a rack 13 meshing with a pinion 14 rigidly mounted on the shaft of the index 15 so that as the beam is rocked (clockwise in the figure) the index will be swung from its zero or no-load position to indicate the weight on the dial or other chart, not shown. The pull of the goods on the commodity support (represented by the draft rod 16 extending downwardly to the suitable aforesaid support, not shown) is transmitted to the weigh-beam by a lever 17, in the present instance a lever of the second class, fulcrumed at 18 and at its other end connected to the weigh-beam, at the right of its fulcrum, by means of a link 19, hooked into a shackle 20 embracing the pivot 21; the draft rod 16 being connected to the lever by pivot 22 and shackle 23. It has been found that the "range line" of lever 17, that is, the imaginary line, straight or angular as the case may be, through the three pivots 18, 22 and 21, should have a certain position, relative to the horizontal, dependent upon the arrangement of the pivots of the base-lever system (not shown) to which the draft rod 16 is connected. Heretofore the practice has been, when the range line is incorrect, to bend the nose piece, carrying the pivot 21, up or down, thereby raising or lowering the pivot 21 relatively to the other two; or to reset the pivot 21 in the nose piece. Both these methods, however, are make-shifts and are notably inconvenient. In the present construction I make the member 24, which carried pivot 21, a separate part (Fig. 5), provided with side flanges 25 on its rear or inner face to embrace the end of the lever and with a vertical slot 26 to receive the set screw 27. Then by loosening the screw the member can be shifted easily and accurately to exactly the proper position to give the proper range line, after which the screw is tightened up to fix the nose piece securely in place. Preferably, also, I make the lever end 28, on which the vertically shiftable member is mounted, in the form of a sleeve or cap, shown more clearly in Fig. 4, fitted to slide on the end of the lever and for that purpose provided with horizontal slots 29 to receive the transverse bolt 30 passing through the lever. The bolt being loosened the sleeve can be shifted in or out to regulate with the utmost accuracy the distance between pivots 21 and 18, to thereby secure the desired leverage ratio, after which the bolt is tightened up to fix the sleeve in position. The pivot-carrier 24 is thus adjustable both vertically and horizontally to determine two highly important factors, namely, the range line of the three pivots and the length of the lever-arm between the end pivots 21 and 18. The sleeve 28 and member 24 constitute what may conveniently be termed a two-part nose-piece.

To automatically counterbalance the applied load I provide a pair of oppositely disposed pendulums 45, each having an equal mass, mounted to swing in a plane parallel with the beam 10 and having depending actuating links 46 which are pivotally connected at their lower ends to an evener bar 47. A short steelyard 48 is pivotally connected to the middle of this evener bar and at its lower end pivotally connects with the beam 10. Upon the application of a load to the load support, the beam 10 swings clockwise drawing down steelyard 48, evener 47 and links 46 and elevating the pendulum until a counterbalance is attained. The use of the evener bar is particularly desirable inasmuch as it permits the scale to weigh correctly when subject to slight irregularities in level.

As is well understood, the normal weighing capacity of an automatic scale—that is, the maximum weight that such a scale can normally counterbalance and indicate—is limited. To increase the capacity of the scale at will (as described in my prior patents hereinbefore mentioned) I provide means for depositing one or more "capacity-weights" 31 on the weigh-beam 10. For this purpose I employ a capacity-weight carrier in the form of two members 32 rigidly connected together in two parallel vertical planes, between which members the capacity weights are hung. As the carrier is rocked counterclockwise on its pivot 33 by the manually actuated arm 34 the weights are deposited in succession upon the knife edges 35 on the weigh-beam 10. The capacity of the scale is thus increased by successive increments, and the value of each increment is directly proportional to two factors, to wit, the mass of the capacity-weight and distance of its knife edge 35 from the fulcrum 11. Preferably these factors are so adjusted as to make the successive increments equal. Thus in the particular scale from which the present drawing is made, manufactured by the American Automatic Scale Company and known as the "American Fifteen Scale," each weight 31 adds a thousand pounds to the weighing capacity of the scale.

Figure 1:
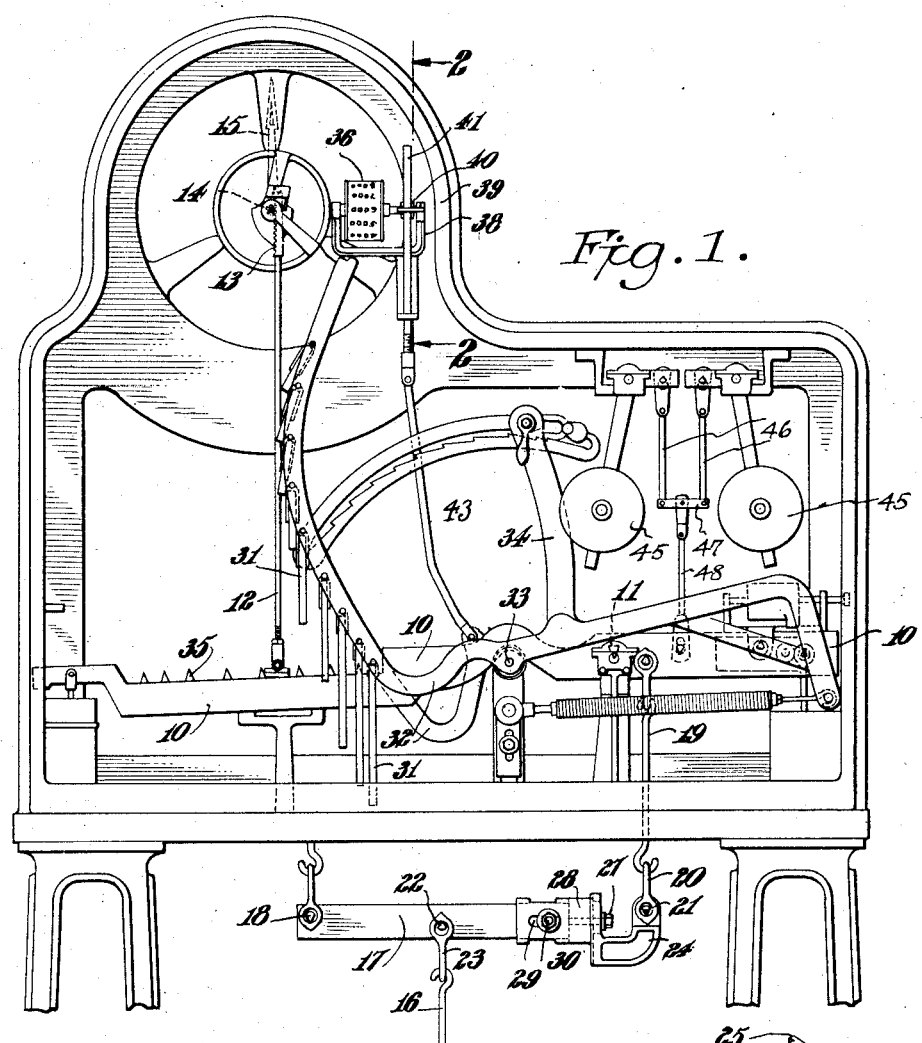
Figure 2:
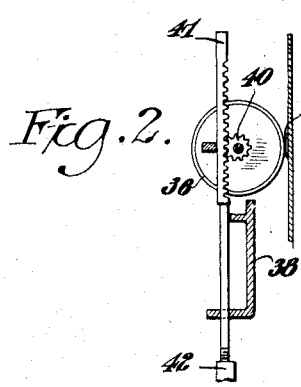
Fig. 2 is a detail section, on a larger scale, taken about on line 2—2 of Fig. 1.
Figure 3:
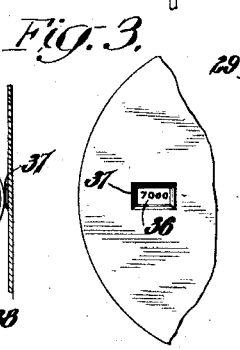
Fig. 3 is a detail front view of Fig. 2.

For the purpose of indicating the increased capacity as the capacity-weights are deposited on the weigh-beam I provide a small drum 36, Figs. 1, 2 and 3, bearing the necessary figures, which can be read through a window 37 in the front of the scale. This drum is journalled in a bracket 38 fixed to the frame 39 and is rotated by a pinion 40, which is itself rotated by a vertical rack 41. The latter is threaded by its lower end in a yoke 42, pivoted to the upper end of a bent link 43 which is pivoted at its lower end to capacity-weight carrier 32. It will therefore be seen that as the carrier is rocked to deposit the capacity weights on the weigh-beam the indicating drum is rotated to display at the window 37 the figures representing the amount which is to be added to the weight indicated on the dial by the pointer 15.

It is to be understood that the invention is not limited to the parts herein specifically illustrated and described, but can be embodied in other forms without departure from its spirit as defined by the following claims.

I claim:

1. In a scale, in combination, a weigh-beam, a draft rod extending to a base lever system, a fulcrumed lever having a connection to said weigh-beam and to said draft rod, said connection including a nose piece, and means adapted to permit the shifting of the position of said nose piece whereby the range line of said lever may be adjusted vertically, and means adapted to permit the shifting of the position of the nose piece horizontally to thereby vary the lever ratio, the aforesaid vertical and horizontal adjusting means upon adjustment of either maintaining the same adjustment of the other.

2. In a scale, in combination, a weigh beam, a draft rod extending to a base lever system, a lever intermediate the draft rod and said beam and having operating connections to said rod and weigh beam, said connection to said weigh beam including a nose piece, a part to which said nose piece is attached, said nose piece being adjustable vertically thereto, said part being attached to the said lever and being longitudinally adjustable relatively thereto.

3. In a scale, in combination, a weigh beam, a draft rod extending to a base lever system, a lever intermediate the draft rod and said beam and having operating connections to said rod and weigh beam, said connection including a nose piece and a supplementary part, said nose piece, supplementary part and intermediate lever being provided with independent adjustable connections therebetween permitting the nose piece to be adjusted vertically or horizontally or in both directions, as desired.

4. In a scale, in combination, a weigh-beam, a draft rod extending to a base lever system, a lever intermediate the draft rod and said beam and having operating connections to said rod and weigh-beam, said connection to said weigh-beam including a nose piece, and means adapted to permit the adjusting of the said nose piece horizontally and vertically with respect to the said lever, whereby the leverage ratio of the lever may be varied and the range line of said lever adjusted with respect to a horizontal line.

5. In a scale, in combination, a lever forming part of an intermediate connection between the support for the goods to be weighed and a weight indicating mechanism, a sleeve embracing the end of said lever and longitudinally adjustable thereto, and a second member embracing said sleeve at the sides thereof and adjustable vertically thereto, and pivot means carried by said last mentioned member adapted to cooperate with a link forming part of the operating connections of the scale for the purpose described.

6. In a scale, in combination, a scale lever having a nose piece carrying a pivot adapted to cooperate with a link, means for adjusting the position of said pivot, said means including a sleeve forming the end of the lever, said sleeve being horizontally slotted to receive a retaining bolt and to permit the adjustment of the sleeve with respect to the lever, and a member having flanges embracing the sleeve and vertically slotted to receive a bolt and to permit the vertical adjustment of said member relatively to said sleeve.

7. In a scale, in combination, a weigh-beam, weight indicating means operated thereby, a capacity weight carrier adapted to deposit one or more capacity weights upon the weigh-beam, a capacity weight indicator comprising a rotatably mounted drum having a pinion secured thereto, and connections between the capacity weight carrier and said indicator, said connections including a rod carrying a rack at the upper end adapted to mesh with said pinion and suitably connected to said capacity weight carrier.

8. In a scale, in combination, a lever having a fulcrum, load-actuated means pivoted to the lever to rock the same, a weigh-beam, means for applying a load-opposing weight thereto, a part carried by said lever and having a pivot for connection with said weigh-beam, and means connecting said pivot and weigh-beam, said part being vertically adjustable relatively to the rest of said lever whereby said pivot can be properly ranged with respect to the fulcrum of the lever and the pivot of the load-actuated means.

In testimony whereof I hereunto affix my signature.

LOUIS ASHLEY OSGOOD.